United States Patent [19]

Harpman

[11] 4,112,889

[45] Sep. 12, 1978

[54] FUEL SYSTEM AND VAPORIZER FOR INTERNAL COMBUSTION ENGINES

[75] Inventor: Webster B. Harpman, Poland, Ohio

[73] Assignee: Energy Research Inc., Murrysville, Pa.

[21] Appl. No.: 745,167

[22] Filed: Nov. 26, 1976

Related U.S. Application Data

[63] Continuation of Ser. No. 535,110, Dec. 20, 1974, abandoned, which is a continuation-in-part of Ser. No. 400,413, Sep. 24, 1973, Pat. No. 3,968,775.

[51] Int. Cl.$^2$ .............................................. F02D 19/00
[52] U.S. Cl. ................................ 123/25 B; 123/25 P; 123/122 F; 123/3; 261/18 A; 48/102 A; 48/103; 48/184
[58] Field of Search ............. 123/122 E, 122 F, 25 R, 123/25 D, 25 E, 25 F, 25 P, 25 B, 25 D, 25 A, 121, 34 A, 133, 122 H, 3; 261/18 A, DIG. 68; 48/102 A, 103, 184

[56] References Cited

U.S. PATENT DOCUMENTS

| | | | |
|---|---|---|---|
| 888,282 | 5/1908 | Westendarp | 123/122 E |
| 1,060,042 | 4/1913 | Wales | 123/122 F |
| 2,150,905 | 3/1939 | Belgau | 123/133 |
| 3,380,442 | 4/1968 | Johnson | 123/122 E X |
| 3,565,201 | 2/1971 | Petsinger | 123/122 E X |
| 3,728,092 | 4/1973 | Gorman, Jr. | 123/122 E X |
| 3,792,688 | 2/1974 | Grainger | 123/122 F |

*Primary Examiner*—Charles J. Myhre
*Assistant Examiner*—Ira S. Lazarus

[57] ABSTRACT

A fuel system for an internal combustion engine of the piston type vaporizes a liquid fuel and water and mixes the resulting gaseous fuel and water vapor with air in a metering valve which communicates with the internal combustion engine. A device operating at a very high temperature, for example 1800° F. is used in the vaporization of the fuel. The high temperature gaseous state of the fuel represents molecules of the greatest degree of separation from each other providing the greatest opportunity for contact of the reacting species in the gaseous condition as chemical reactions occur only between particles at the atomic or molecular level and it is necessary for the reacting species to be in actual contact at the time of reaction. The fuel system therefore enables complete combustion and the elimination of the atmospheric pollutants common in the operation of internal combustion engines.

9 Claims, 3 Drawing Figures

FUEL SYSTEM AND VAPORIZER FOR INTERNAL COMBUSTION ENGINES

This is a continuation of application Ser. No. 535,110, filed Dec. 20, 1974, now abandoned, which is a continuation in part of application Ser. No. 400,413, filed Sept. 24, 1973, now U.S. Pat. No. 3,968,775.

BACKGROUND OF THE INVENTION

1. Field of the Invention

This invention relates to fuel systems and varporizing devices therein for internal combustion engines of the piston type.

2. Description of the Prior Art

Fuel systems for internal combustion engines of the piston type have generally comprised carburetors in which liquid fuel is delivered into a stream of air and divided into a series of fine droplets approaching vaporization and immediately conveyed to the point of combustion. Only those molecules at the surface of the fuel droplets are in a position to react with another species and incomplete combustion results because the very short time allowed is insufficient for more than a little vaporization of the fuel to occur. The prior art engines therefore exhaust large quantities of hydrocarbons, carbon monoxide and oxides of nitrogen all of which are undesirable atmospheric pollutants.

This invention vaporizes the liquid fuel at very high temperatures so that in its heated gaseous state it will detonate at a very high rate and adds the water vapor to reduce the high rate of detonation of the fuel to achieve practically complete combustion and desirable reaction time in the internal combustion engine.

SUMMARY OF THE INVENTION

A fuel system having novel high temperature vaporizer for an internal combustion engine of the piston type is disclosed in which liquid fuel such as gasoline is vaporized to produce a gaseous fuel which is delivered under pressure to a metering valve. Simultaneously water is vaporized and water vapor is delivered to the same metering valve and the primary combustion air is available to the metering valve. The partial vacuum resulting from the operation of the pistons in the internal combustion engine moves the combustion air with the proper quantities of gaseous fuel and water vapor to the points of combustion in the cylinders of the engine. the vaporization of the liquid fuel and the water is caused by high temperature heat from an external source.

DESCRIPTION OF THE PREFERRED EMBODIMENT

Figure 2:
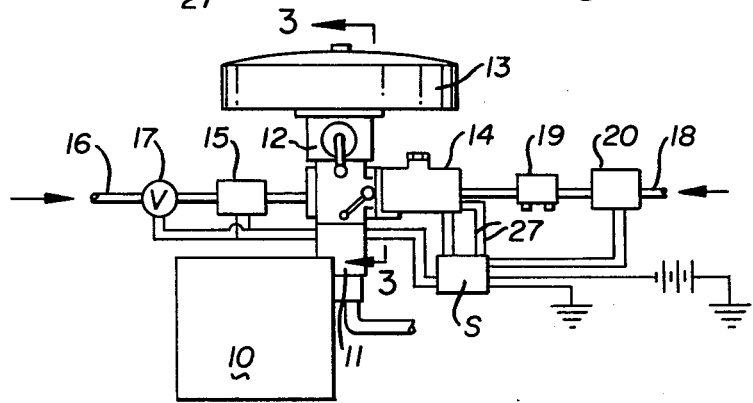
FIG. 2 is a diagrammatic illustration of a fuel system for an internal combustion engine and incorporating the vaporizer of FIG. 1.

By referring to the drawings and FIG. 2 thereof, the form of the invention chosen for illustration and description herein may be seen. A fuel system for an internal combustion engine is illustrated in operative communicaton with an internal combustion engine 10 of the piston type in which the inlet manifold is indicated at 11 in communication with a metering valve 12 to which primary air is available as from an air cleaner 13. Vaporized fuel in a gaseous form is delivered to the metering valve 12 from a vaporizer 14 and water vapor is supplied to the metering valve 12 by a boiler 15, by way of a tubular conduit 16 having a solenoid valve 17 therein.

Liquid fuel such as gasoline is supplied the vaporizer 14 by a fuel line 18 having a preheater device 19 therein and communicating with a pump 20.

Figure 1:
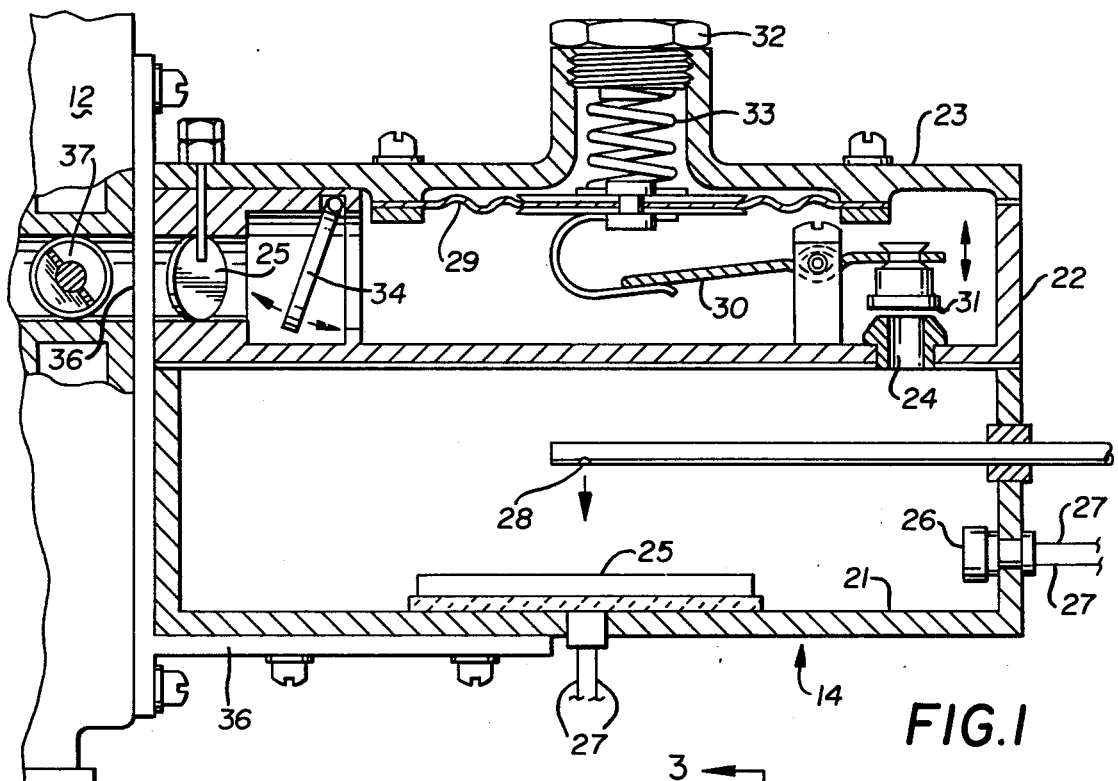
FIG. 1 is a cross sectional elevation of a liquid fuel vaporizer.

By referring now to FIG. 1 of the drawings, it will be seen that the vaporizer 14 consists of a hollow body 21 having a closure formed of a secondary hollow body 22 which in turn is closed by a cap 23. A port 24 in the secondary hollow body 22 communicates with the hollow body 21 and a vaporizing chamber therein.

The hollow body 21 which forms the vaporizing chamber has a flat unbroken heater 25 which includes an electric heating element controlled by a temperature and pressure actuated device 26 which acts to connect the electric heating element in the heater 25 with a power source by way of conductors 27. The arrangement is such that the device 26 energizes the heater 25 and the pump 20 and the electric heating element in the heater 25 supplies sufficient heat to flash vaporize the liquid fuel, at least 700° F. is necesary to produce a gaseous fuel.

It has been determined that by operating the heater 25 at or near 1800° F. and directing the liquid fuel thereagainst by a nozzle 28 will provide a very rapid rate of flash vaproziation and a desirable hot gaseous fuel. Still referring to FIG. 1 of the drawings, it will be seen that the secondary hollow body 22 of the vaporizer 14 defines a secondary chamber in which a diaphragm 29 is positioned for the operation of a lever 30 which moves a valve 31 toward and away from the port 24 which communicates with the vaporization chamber in the hollow body 21. The diaphragm 29, lever 30 and valve 31 form a pressure regulator that is adjustable as by an adjustment bolt 32 which biases a spring 23 engaging the diaphragm 29 as will be understood by those skilled in the art. The arrangement is such that hot gaseous fuel pressures of up to 20 P.S.I. in the vaporization chamber in the hollow body 21 are reduced to 4 or 5 ounces P. S. I. in the secondary hollow body 22. The regulating action acts to maintain a uniform supply of hot gaseous fuel at a desired low pressure so that is volume and/or rate of flow into the metering valve is satisfactory under all operating conditions. The flow rate and volume of air and hot gaseous fuel through the metering valve 12 and into the intake manifold 11 of the engine 10 is controlled by the metering valve 12. Throttle control of the engine is therefore the same as with a liquid fuel carburetor as manually controlled butterfly and rotary valves in the metering valve 12 directly control the air and gaseous fuel.

By referring again to FIG. 1 of the drawings, it will be seen that the secondary hollow body 22 incorporates a check valve 34 and a butterfly valve 35 respctively downstream in the hot gaseous fuel flow path therefrom. The check valve 34 is open downstream, and the butterfly valve 33 enables the amount of hot gaseous fuel flowing from the vaporizer to be set.

Those skilled in the art will observe that a desirable ratio between the gaseous fuel and the water vapor delivered the metering valve 12 by the fuel system hereinbefore described is desirable and it has been determined that the water vapor obtained from 1 gallon of water uniformly and continuously supplied the metering valve 12 provides a suitable ratio with respect to 40 gallons of liquid gasoline delivered to the vaporizer 14 by the pump 20.

It will further occur to those skilled in the art that an anti-freeze additive such as alcohol can be added to the water supplied the boiler 15 without affecting the operation of the device and without changing the water vapor gaseous fuel ratio significantly.

The metering valve 12 may comprise any suitable commercial device which will control the amount of air and a gaseous fuel admitted thereto for delivery to the inlet manifold 11 and one such suitable metering valve is generally available under the trademark CENTURY. In the preferred embodiment as seen in FIGS. 2 and 3 the metering valve 12 provides throttle control with respect to the amount of the air and hot gaseous fuel admitted to the inlet manifold 11 of the internal combustion engine, responsive to the partial vacuum in the inlet manifold 11 as will be understood by those skilled in the art and the water vapor may be introduced into the metering valve 12 and similarly metered thereby or the very small quantity of water vapor required may be continously injected therein when the fuel system is operating.

Figure 3:
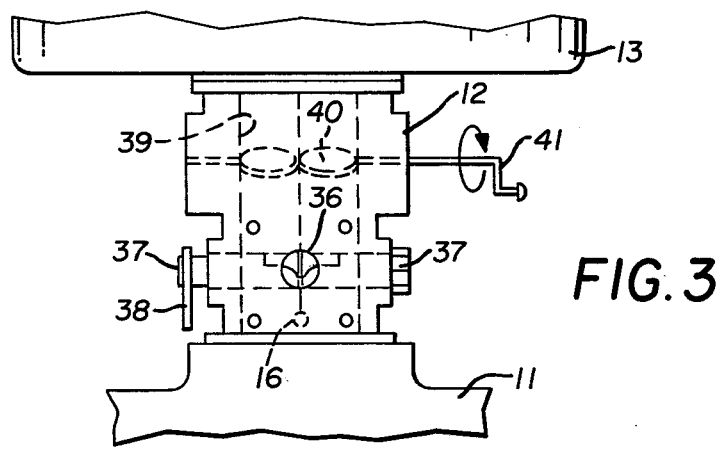
FIG. 3 is an enlarged detail view of a portion of the fuel system.

The metering valve 12 hereinbefore referred to is partially illustrated in FIGS. 1, 2 and 3 of the drawings and in FIG. 1 of the drawings it will be seen that the vaporizer which has been generally indicated by the numeral 14 is attached to the side of the metering valve 12 by a bracket 36 so that the hot gaseous fuel passageway therefrom communicates with a port 36 in th metering valve and directly with a rotary metering valve assembly 37 disposed transversely with respect to the port 36 so that the volume of hot gaseous fuel entering the metering valve 12 may be controlled thereby as will be understood by those skilled in the art, who will recognize that the rotary metering valve assembly is externally controlled as by a lever 38 which is moved by the throttle of the internal combustion engine on which the device is located. The variable amounts of hot gaseous fuel passed by the rotary metering valve assembly 37 flow directly into the air passageway 39 through the metering valve 12 which is controlled by one or more butterfly valves 40, which are also exteriorly operated as by a crank 41 which in turn is moved by the throttle linkage of the internal combustion engine along with the rotary metering valve assembly 37 hereinbefore described. The metering valve 12 may comprise any commercially available metering valve such as heretofore used in connection with vaporized liquid petroleum gas in the operation of motor vehicles.

Tests on an 8 cylinder American Motors engine operating at 1,000 rpms, after warmup, using gasoline of 90 octane showed an exhaust containing 200 parts per million hydrocarbons and 4.50 percent carbon monoxide with the factory installed carburetor and after a mechanical tune-up. The same engine modified only in replacing the carburetor with the metering valve as hereinbefore described and using the fuel system as hereinbefore described in connection therewith and operated at 1000 rpm and using the hot vaporized 90 octane gaseous fuel and water vapor and after the same degree of warmup, produced an exhaust free of hydrocarbons and only 0.05 percent carbon monoxide.

Those skilled in the art will be aware that decomposition of a fuel molecule may occur without combustion occuring unless there is sufficient time and sufficient oxygen. Such decomposition (pyrolysis) produces products which may be more toxic than the original fuel and the elimination of the possibility of such pyrolysis products in the exhaust may be achieved by insuring as complete combustion as possible with the invention hereinbefore described.

A series of tests with a V8 engine at several engine speeds are noted on an attached page; a part of this specification by reference.

The test results provide a comparison of the exhaust emissions of the same engine, with gasoline, with and without the fuel system of the invention, with propane (a gaseous fuel) and with and without the water vapor.

Th test results show hydrocarbons in the exhaust in parts per million and the percentages of carbon monoxide present.

Those skilled in the art will recognize that oxides of nitrogen in exhaust emissions vary with the degree of combustion of the fuel and it is therefore believed that the fuel system of this invention reduces such emissions in the same or similar ratio as the reduction of hydrocarbons and carbon monoxide.

Although but one embodiment of the present invention has been illustrated and described, it will be apparent to those skilled in the art that various changes and modifications may be made therein without departing from the spirit of the invention.

Having thus described my invention what I claim is:

1. An improved fuel system for an internal combustion engine having an inlet manifold; a metering valve in communication therewith arranged to control air flowing therethrough and to control and introduce gaseous fuel into said air and direct said air and gaseous fuel to said inlet manifold, a water vaporizer and a supply of water therefor and a liquid fuel vaporizer and a supply of liquid fuel therefor, heating means for said water and fuel vaporizers for generating water vapor and hot gaseous fuel under pressure respectively and means establishing communication between said water vapor and said metering valve and between said liquid fuel vaporizer and said metering valve, said liquid fuel vaporizer including means responsive to temprature to exclusively control the vaporization of said liquid fuel, a pressure regulator device in said communication means between said liquid fuel vaporizer and said metering valve arranged to control the pressure of and to permit said hot gaseous fuel to flow only from said pressure regulator device to said metering valve.

2. The fuel system of claim 1 and wherein a one way valve is located in said communication means downstream with respect to said pressure regulator device, said one way valve being open toward said metering valve.

3. The fuel system of claim 1 and wherein the heating means for said liquid fuel vaporizer is an electric resistance heating device in the vaporizer operating at temperatures between 700° F. and 1800° F. and having a flat unbroken area against which said liquid fuel is delivered for flash point vaporization thereon.

4. The fuel system of claim 1 and wherein the liquid fuel vaporizer and the metering valve are directly connected to one another to insure delivery of the hot gaseous fuel thereto.

5. The fuel system of claim 1 and wherein said pressure regulator device is incorporated in said liquid fuel vaporizer and heated thereby.

6. The fuel system of claim 1 and wherein said pressure regulator device, at least one control valve and said communication means are incorporated in said liquid fuel vaporizer and heated thereby.

7. The method of forming a gaseous fuel for an internal combustion engine comprising the steps of delivering liquid fuel onto a heated surface in a first chamber to form a hot gas, controlling the temperature and pressure of said hot gas in said first chamber independently of the operating temperatures of other regions of said internal combustion engine, permitting the hot gas to flow through a mechanical pressure regulator so as to reduce the pressure thereof, permitting the hot gas to flow through mechanical valves for regulating the volume thereof, delivering hot water vapor into said hot gas downstream of said pressure regulator, and delivering said hot gaseous fuel into the inlet manifold of said internal combustion engine.

8. The method of claim 7 and wherein said hot gas is permitted to flow through a heated mechanical pressure regulator so as to prevent loss of heat from said hot gas.

9. The method of claim 7 and wherein said hot gas is permitted to flow through a heated mechanical pressure regulator and through heated mechanical valves so as to prevent loss of heat from said hot gas.

* * * * *